US009701058B2

(12) United States Patent
Valle et al.

(10) Patent No.: US 9,701,058 B2
(45) Date of Patent: Jul. 11, 2017

(54) SPIRAL-WOUND PTFE GASKET AND METHODS OF MANUFACTURE

(71) Applicant: Teadit N.A., Inc., Pasadena, TX (US)

(72) Inventors: Andre Carlos de Azevedo Valle, Rio de Janeiro (BR); Jose Antonio de Almeida Neto, Campos do Jordao (BR); Jose Carlos Carvalho Veiga, Rio de Janeiro (BR)

(73) Assignee: TEADIT N.A., INC., Pasadena, TX (US)

( * ) Notice: Subject to any disclaimer, the term of this patent is extended or adjusted under 35 U.S.C. 154(b) by 0 days.

(21) Appl. No.: 15/267,431

(22) Filed: Sep. 16, 2016

(65) Prior Publication Data
US 2017/0080631 A1    Mar. 23, 2017

Related U.S. Application Data

(60) Provisional application No. 62/220,112, filed on Sep. 17, 2015.

(51) Int. Cl.
| | | |
|---|---|---|
| *B29B 13/06* | (2006.01) | |
| *B29C 53/56* | (2006.01) | |
| *B29C 43/00* | (2006.01) | |
| *B29C 55/00* | (2006.01) | |
| *B29C 65/48* | (2006.01) | |
| *B29C 69/00* | (2006.01) | |
| *F16J 15/02* | (2006.01) | |
| *F16J 15/10* | (2006.01) | |

(Continued)

(52) U.S. Cl.
CPC ............ *B29C 53/562* (2013.01); *B29B 13/06* (2013.01); *B29C 43/003* (2013.01); *B29C 53/8083* (2013.01); *B29C 53/845* (2013.01); *B29C 55/005* (2013.01); *B29C 55/18* (2013.01); *B29C 65/48* (2013.01); *B29C 69/002* (2013.01); *F16J 15/022* (2013.01); *F16J 15/104* (2013.01); *B29K 2027/18* (2013.01); *B29K 2105/16* (2013.01); *B29L 2031/265* (2013.01)

(58) Field of Classification Search
CPC ...................................................... B29C 53/56
See application file for complete search history.

(56) References Cited

U.S. PATENT DOCUMENTS

| | | | |
|---|---|---|---|
| 3,953,566 A | | 4/1976 | Gore |
| 5,382,399 A | * | 1/1995 | Moret de Rocheprise ........... B29C 53/581 156/190 |
| 2005/0225037 A1 | * | 10/2005 | Dove ..................... F16J 15/104 277/610 |

FOREIGN PATENT DOCUMENTS

| | | | |
|---|---|---|---|
| EP | 1800029 B1 | | 2/2009 |
| GB | 1466183 A | * | 3/1977 |
| JP | 11-51192 A | * | 2/1999 |

OTHER PUBLICATIONS

Machine Translation of JP 11-51192, date unknown.*

* cited by examiner

*Primary Examiner* — Jeff Aftergut
(74) *Attorney, Agent, or Firm* — Haynes and Boone, LLP

(57) ABSTRACT

A method of manufacturing a spiral-wound PTFE gasket includes winding a laminated PTFE tape (300) around a shaft (305) that has an outer diameter that coincides with the gasket inner diameter to create a PTFE cylinder (315) having an outer diameter that coincides with the gasket outer diameter; sintering the PTFE cylinder (315); and removing a radial segment of the PTFE cylinder (315) to form the (Continued)

gasket (100), the radial segment having a thickness that coincides with the gasket thickness.

24 Claims, 15 Drawing Sheets

(51) Int. Cl.
    *B29C 53/80*        (2006.01)
    *B29C 53/84*        (2006.01)
    *B29C 55/18*        (2006.01)
    *B29K 27/18*        (2006.01)
    *B29K 105/16*     (2006.01)
    *B29L 31/26*       (2006.01)

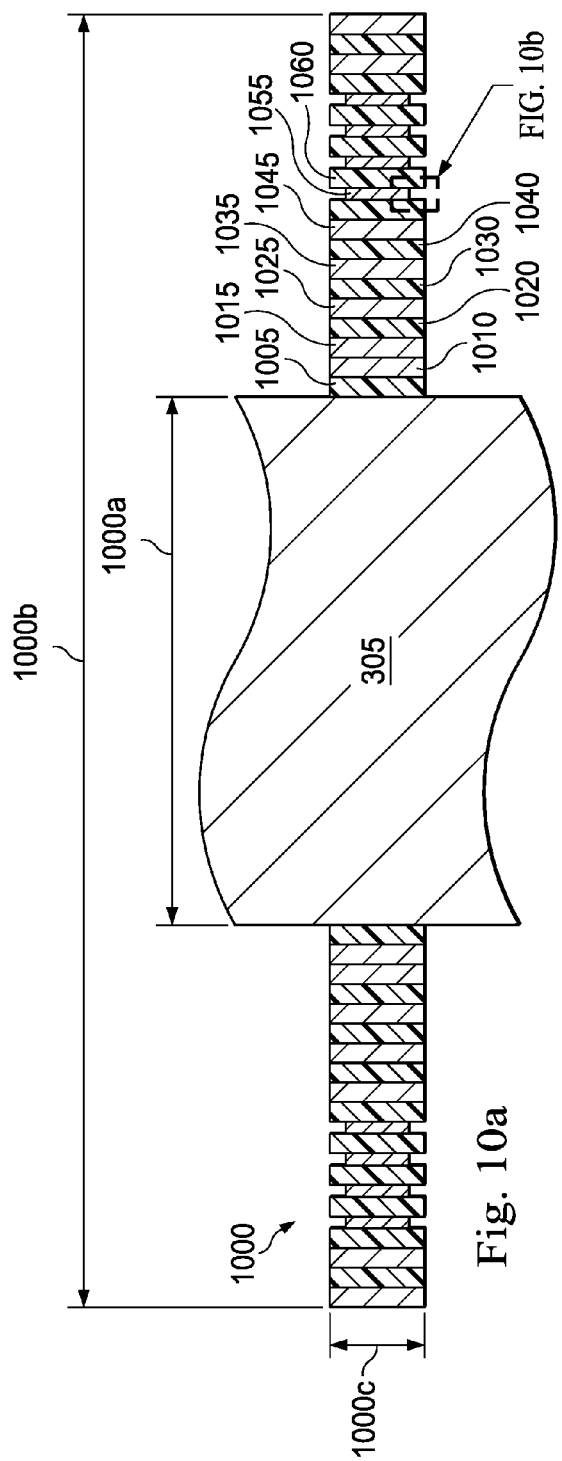
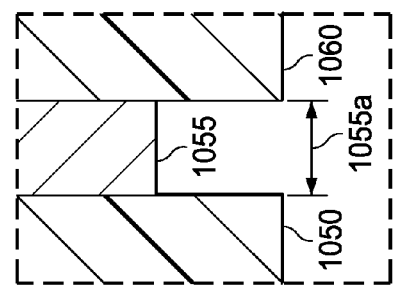
Fig. 10a
Fig. 10b

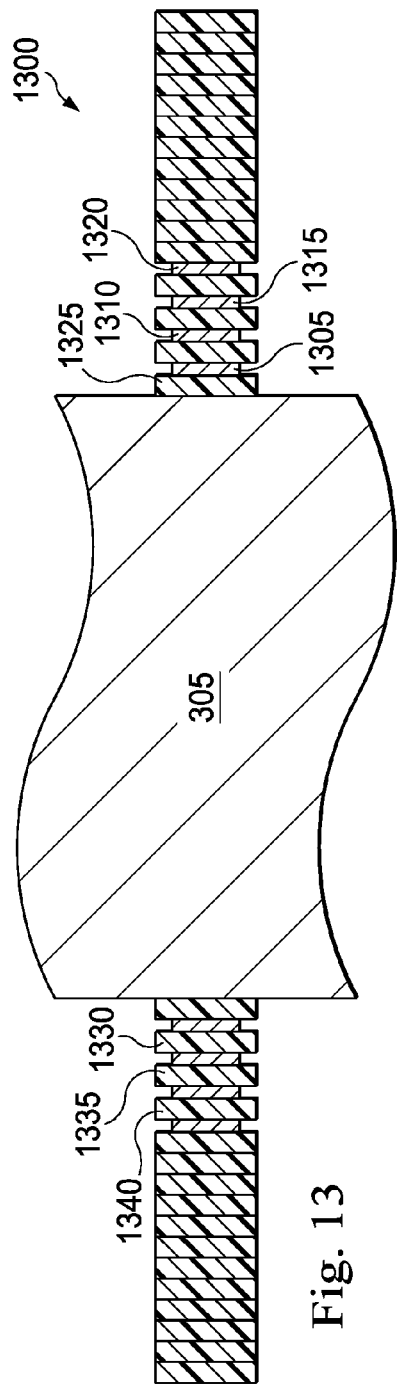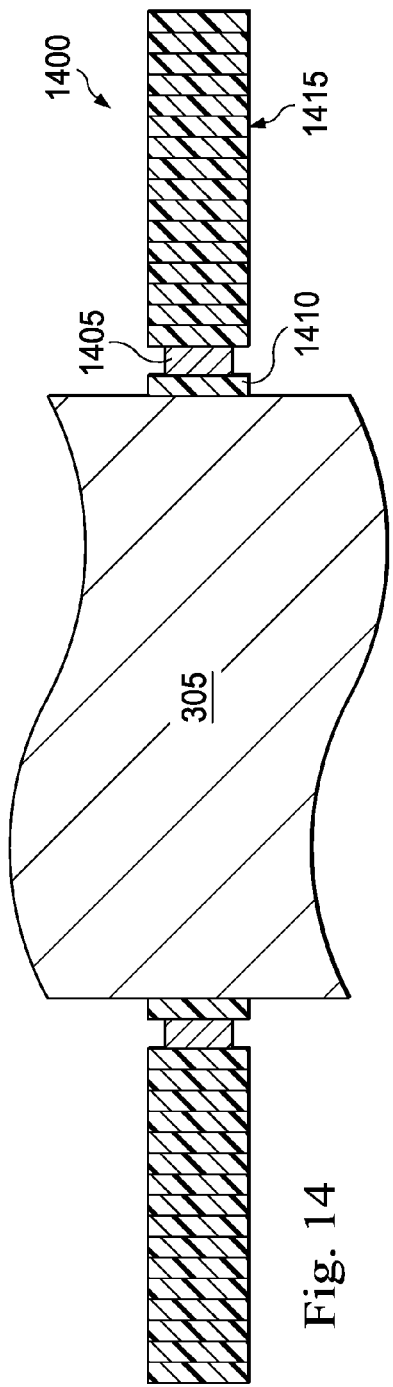

SPIRAL-WOUND PTFE GASKET AND METHODS OF MANUFACTURE

CROSS-REFERENCE TO RELATED APPLICATION

This application claims the benefit of the filing date of, and priority to, U.S. Application Ser. No. 62/220,112, filed Sep. 17, 2015, the entire disclosure of which is hereby incorporated herein by reference.

FIELD OF THE DISCLOSURE

The present application relates to a polytetrafluoroethylene gasket and methods of manufacture. More particularly, the present application relates to a spiral-wound, polytetrafluoroethylene gasket and methods of manufacture.

BACKGROUND

Polytetrafluoroethylene ("PTFE") gaskets are commonly used to seal flanged joints in industrial applications because of their chemical resistance to many media products and their mechanical properties for electrical insulation, anti-stick, impact resistance, and low friction coefficient. Generally, the methods of manufacturing PTFE gaskets involve stamping out circular gaskets of a desired size from a sheet of PTFE. After the circular gaskets have been removed from the PTFE sheet, the remainder of the PTFE sheet is waste, which can be around 40% to 60% of the PTFE sheet. These manufacturing methods produce gaskets that are limited in size by the machinery used and may be weak due to splices formed within large size gaskets. These manufacturing methods also produce large amounts of PTFE sheet waste, which can raise manufacturing costs.

BRIEF DESCRIPTION OF THE DRAWINGS

FIG. 10a illustrates a sectional view of the shaft and a disc during a step of the method of FIG. 9, according to an exemplary embodiment.

FIG. 10b illustrates an enlarged portion of the disc of FIG. 10a, according to an exemplary embodiment.

FIG. 13 illustrates a sectional view of the shaft and the disc of FIG. 10a, according to yet another exemplary embodiment.

FIG. 14 illustrates a sectional view of the shaft and the disc of FIG. 10a, according to yet another exemplary embodiment.

DETAILED DESCRIPTION

Figure 1:
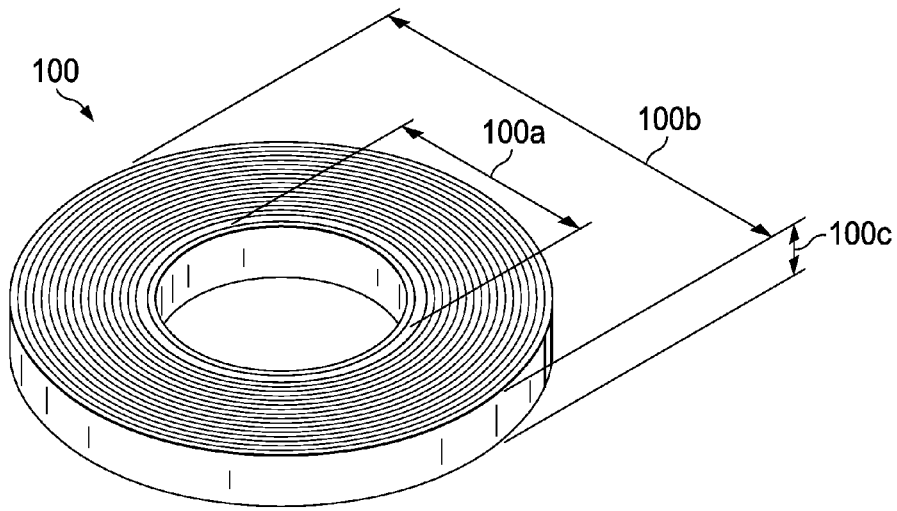
FIG. 1 illustrates a perspective view of a spiral-wound PTFE gasket, according to an exemplary embodiment of the present disclosure.

Reference is now made to the drawings that illustrate certain embodiments of the present disclosure. It should be understood that the present disclosure is not limited to the embodiments shown in the drawings.

The present disclosure provides a method of manufacturing a gasket having a gasket thickness, a gasket inner diameter, and a gasket outer diameter, the method including winding a laminated PTFE tape around a shaft that has an outer diameter that coincides with the gasket inner diameter to create a PTFE cylinder having an outer diameter that coincides with the gasket outer diameter; sintering the PTFE cylinder; and removing a radial segment of the PTFE cylinder to form the gasket, the radial segment having a thickness that coincides with the gasket thickness. In one exemplary embodiment, the method also includes drying the PTFE cylinder. In one exemplary embodiment, the method also includes compressing the PTFE cylinder in a mold. In one exemplary embodiment, the method also includes winding one or more polymer tapes around the shaft. In one exemplary embodiment, the method also includes stretching the laminated PTFE tape. In one exemplary embodiment, the method also includes laminating a PTFE billet to form the laminated PTFE tape.

The present disclosure provides a method of manufacturing a gasket having a gasket thickness, a gasket inner diameter, and a gasket outer diameter, the method including winding, or wrapping, a laminated PTFE strip around a shaft that has an outer diameter that coincides with the gasket inner diameter to create a PTFE disc having an outer diameter that coincides with the gasket outer diameter; and sintering the PTFE disc. In one exemplary embodiment, the method also includes compressing the PTFE disc in a mold. In one exemplary embodiment, the method also includes winding one or more polymer strips around the shaft. In one exemplary embodiment, the method also includes winding a metallic strip around the shaft. In one exemplary embodiment, the method also includes laminating a PTFE billet to form a laminated PTFE tape. In one exemplary embodiment, the method also includes drying the laminated PTFE tape. In one exemplary embodiment, the method also includes cutting the laminated PTFE tape to form the laminated PTFE strip. In one exemplary embodiment, the method also includes sintering the laminated PTFE tape. In one exemplary embodiment, the method also includes stretching the laminated PTFE tape. In one exemplary embodiment, the laminated PTFE strip has a width that coincides with the gasket thickness. In one exemplary embodiment, the polymer strip has a width that coincides with the gasket thickness. In one exemplary embodiment, the metallic strip has a width that is less than a width of the PTFE strip.

FIG. 1 illustrates a perspective view of a spirally-wound, PTFE (or Teflon®) gasket that is generally referred to by the reference numeral 100. The gasket 100 defines an inner diameter 100a, an outer diameter 100b, and a gasket thickness 100c. Often, the gasket 100 is used for sealing a flanged joint on any number of mechanical elements, such as for example manways and process piping.

Figure 2:
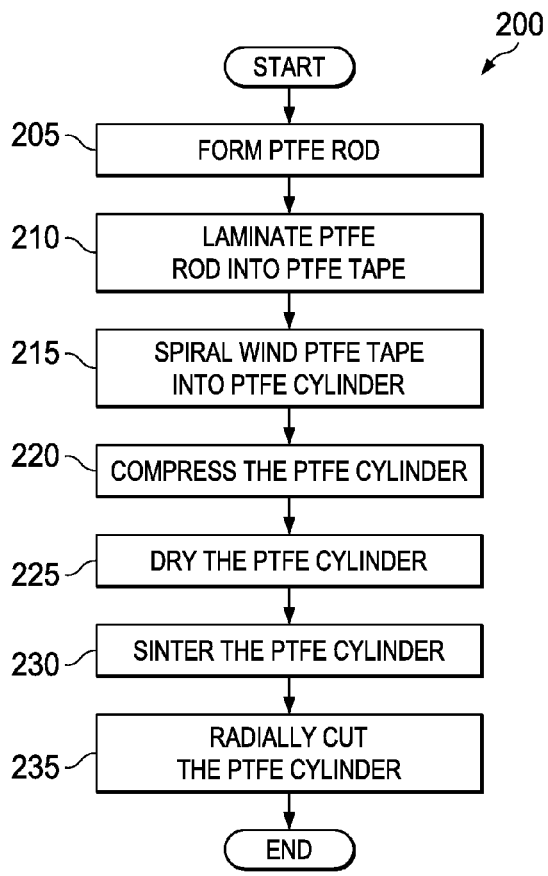
FIG. 2 is a flow chart illustration of a method of manufacturing the gasket of FIG. 1, according to an exemplary embodiment.

FIG. 2 illustrates a method of manufacturing the gasket 100 and is generally referred to by the reference numeral 200. Referring to FIG. 2, the method 200 of manufacturing the gasket 100 includes forming a PTFE rod at step 205, laminating the PTFE rod into PTFE tape at step 210, spiral winding the PTFE tape into a PTFE cylinder at step 215, compressing the PTFE cylinder at step 220, drying the PTFE cylinder at step 225, sintering the PTFE cylinder at step 230, and radially cutting the PTFE cylinder at step 235.

At the step 205, powdered PTFE and a lubricant are mixed together and compressed to form a PTFE billet. In some embodiments, any number of fillers are added to the powered PTFE and lubricant mixture. The fillers may be mineral fillers, such as hollow glass micro-spheres, barite, mineral silica and graphite, or non-mineral fillers. The PTFE billet is then uniaxially, biaxially, or multiaxially extruded to form a PTFE rod.

At the step 210, the PTFE rod is laminated into PTFE tape. Generally, conventional methods are used to laminate the PTFE rod to form the PTFE tape.

Figure 3:
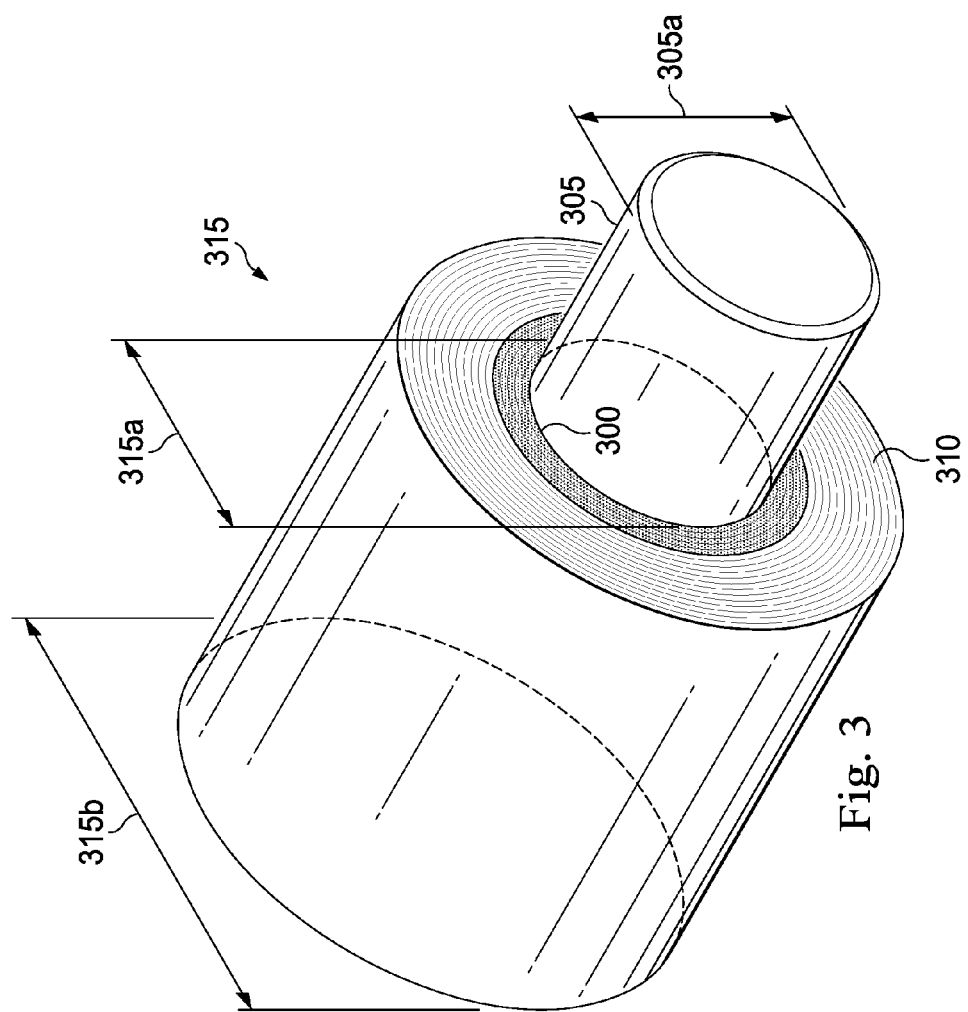
FIG. 3 is a perspective view of a PTFE cylinder and a shaft during a step of the method of FIG. 2, according to an exemplary embodiment.
Figure 4:
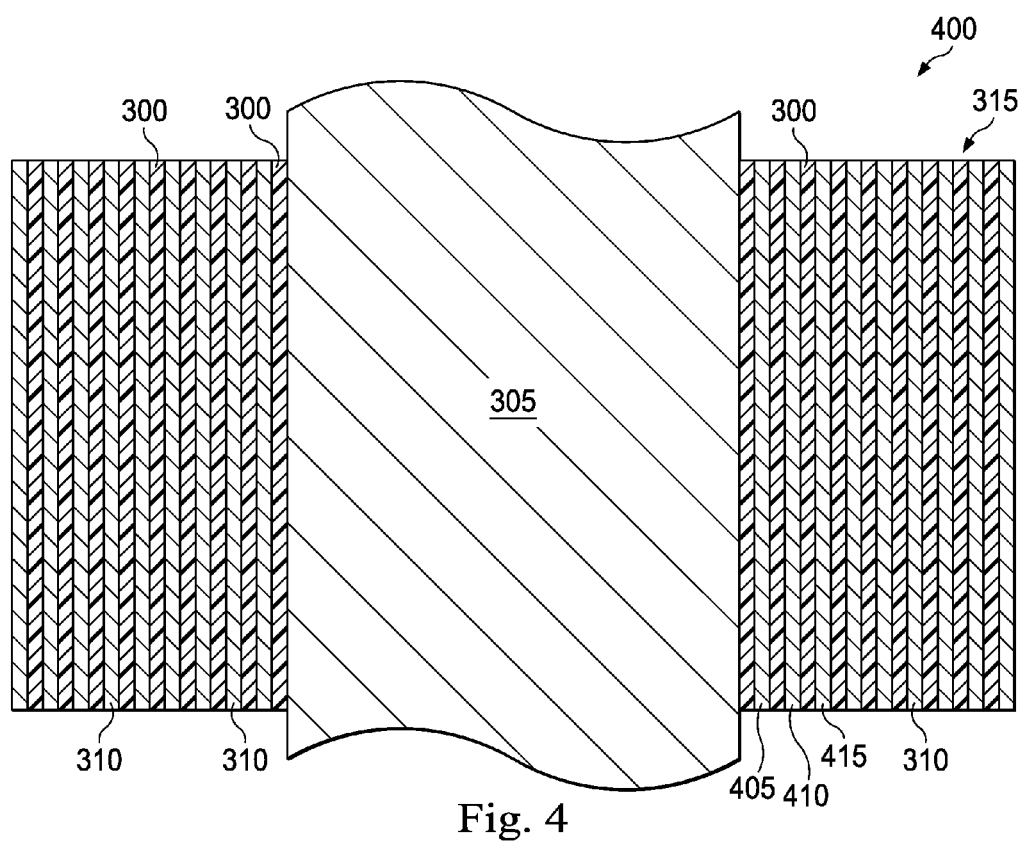
FIG. 4 illustrates a sectional view of the shaft and the PTFE cylinder of FIG. 3, during a step of the method of FIG. 2, according to an exemplary embodiment.
Figure 5:
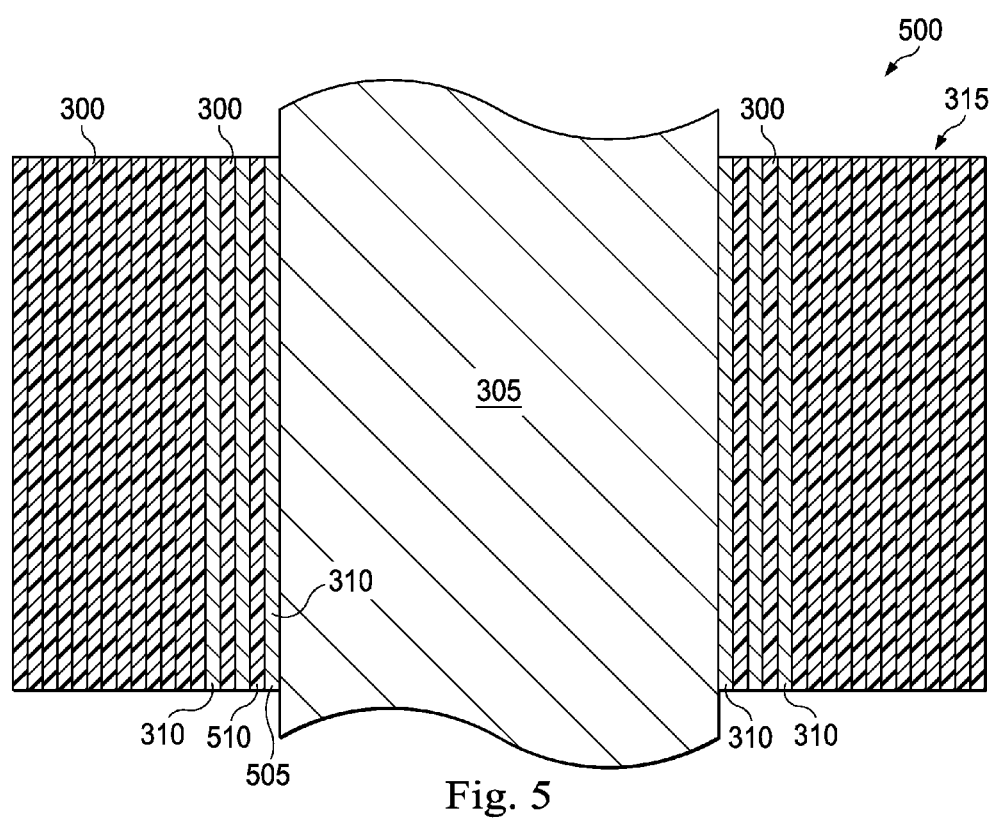
FIG. 5 illustrates a sectional view of the shaft and the PTFE cylinder of FIG. 3, according to another exemplary embodiment.

At the step 215 and as shown in FIG. 3, a PTFE tape 300 is spirally wound around a central axis, or shaft 305. The shaft 305 has an outer diameter 305a that coincides with, or is equal to, a desired inner diameter of a gasket, or coincides with the inner diameter 100a of the gasket 100. One or more polymer tapes 310 that include one or more polymer materials, such a low porosity or dense PTFE, ethylene tetrafluoroethylene (ETFE), perfluoroalkoxy (PFA), tetrafluoroethylene-perfluoro copolymer (TFM), and fluoroethylene propylene (FEP) materials, may also be spirally wound around the PTFE tape 300 and the shaft 305. For example, the one or more polymer tapes 310 may be low porosity or dense laminated PTFE tapes. Generally, the one or more polymer tapes 310 include a material that is less porous than the PTFE tape 300. In an exemplary embodiment, the one or more polymer tapes 310 includes an impermeable polymer tape. The one or more polymer tapes 310, such as a polymer tape composed of dense PTFE, increase the sealability of the gasket 100 by providing a barrier against media leakage. Together, the PTFE tape 300 and the one or more polymer tapes 310 form a composite PTFE cylinder 315. The tapes 300 and 310 may be alternately wound around the shaft 305 in a variety of patterns. Alternatively, the one or more polymer tapes 310 may be omitted to produce a uniform PTFE cylinder (not shown). Regardless, tape is wound around the shaft 305 to form a PTFE cylinder having an inner diameter 315a that coincides with the inner diameter 100a of the gasket 100 and is continued to be wound until the composite PTFE cylinder 315 (or uniform PTFE cylinder) has an outer diameter 315b that coincides with the desired width of the gasket, or coincides with the outer diameter 100b of the gasket 100. A cross-sectional view of the shaft 305 and one embodiment of the composite PTFE cylinder 315 that is referenced by the numeral 400 is depicted in FIG. 4. Referring to FIG. 4, a first layer of the PTFE tape 300 is attached or otherwise connects with the shaft 305 and forms an inner diameter of the cylinder 400. Moving in a direction from the inner diameter of the PTFE cylinder 400 and radially outward, the one or more polymer tapes 310 and the PTFE tape 300 alternate to form polymer layers and PTFE tape layers. Each polymer layer 405, 410, 415 and so on forms a barrier between two PTFE tape layers, between a PTFE tape layer and the inner diameter, and/or between a PTFE tape layer and the outer diameter. In another embodiment, the one or more polymer tapes 310 may be adhered or otherwise attached to the shaft 305 and wound around the shaft 305. A cross-sectional view of the shaft 305 and another embodiment 500 of the composite PTFE cylinder 315 is depicted in FIG. 5. Referring to FIG. 5, the one or more polymer tapes 310 are adhered to the shaft 305. After the one or more polymer tapes 310 are wound around the shaft 305, the PTFE tape 300 is then adhered or otherwise attached to the one or more polymer tapes 310 that are wound around the shaft 305. In this case, the layer of the one or more polymer tapes 310 that is located between the shaft 305 and the PTFE tape 300 forms a polymer layer 505 that is a barrier between the shaft 305 and a PTFE tape layer 510. Multiple barriers, or layers of the one or more polymer tapes 310, may be created in this manner to provide a plurality of barriers that are radially spaced from the shaft 305 and between the layers of PTFE tape 300.

Figure 6:
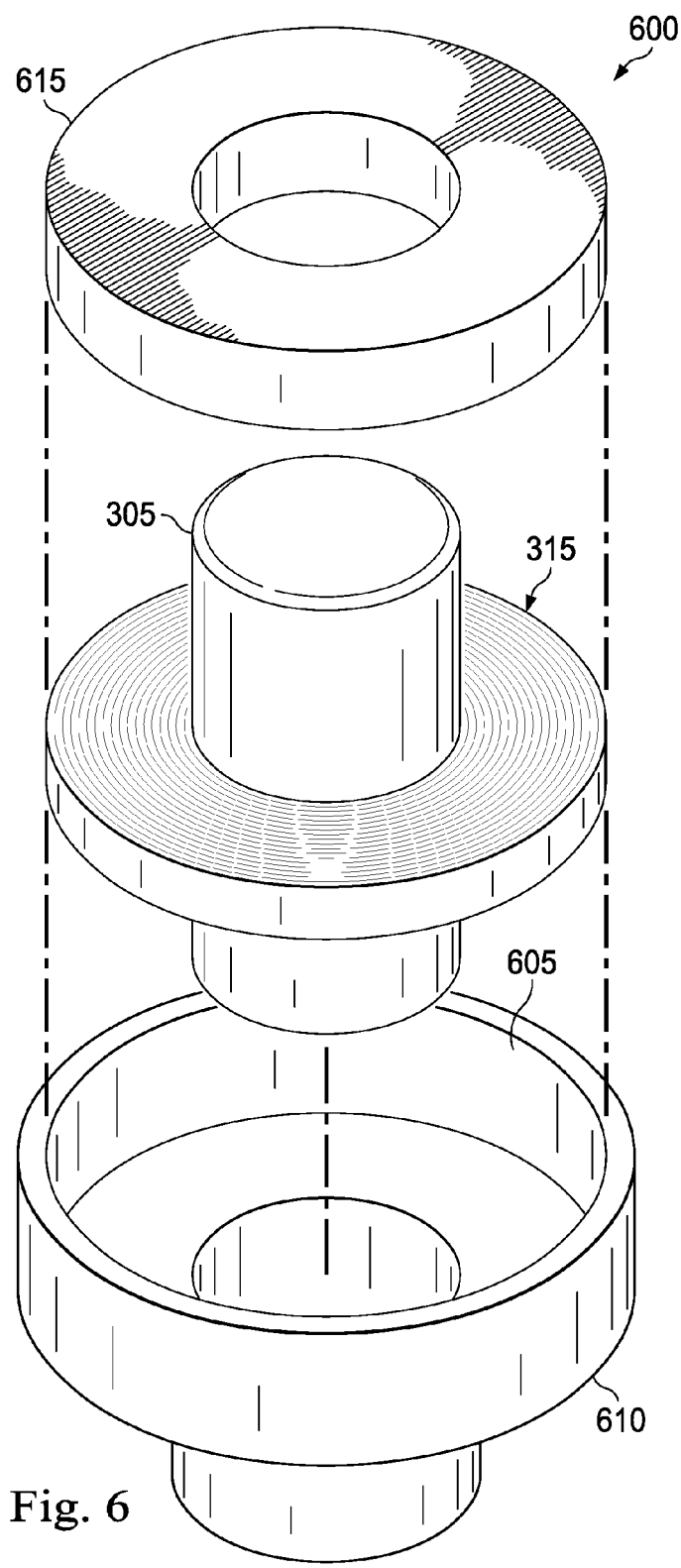
FIG. 6 is an exploded view of a mold, the shaft, and the PTFE cylinder of FIG. 3, according to an exemplary embodiment.

At the step 220, the composite PTFE cylinder 315 is compressed in a mold 600, as shown in FIG. 6. Referring to FIG. 6, and in one embodiment, the PTFE cylinder 315 and the shaft 305 may be placed in a cavity 605 formed in a lower portion 610 of the mold 600. The composite PTFE cylinder 315 is then compressed between an upper portion 615 of the mold 600 and the lower portion 610. In an exemplary embodiment, the mold 600 compresses the composite PTFE cylinder 315 at a pressure from 1 MPa to 70 MPa.

At the step 225, the composite PTFE cylinder 315 is dried in an oven to remove the lubricant. Generally, the composite PTFE cylinder 315 remains engaged with the shaft 305 when dried in the oven. In an exemplary embodiment, the step 225 includes conventional methods of drying the PTFE in an oven.

At the step 230, the composite PTFE cylinder 315 is sintered.

At the step 235, the composite PTFE cylinder 315 is radially cut in increments coinciding with the gasket thickness 100c, to form the gasket 100. Thus, a radial segment having a thickness that is equal to the gasket thickness 100c is removed from PTFE cylinder 315 to form the gasket 100.

Using the method 200, a gasket 100 is formed that has an impermeable or nearly impermeable polymer layer that results (due to the one or more polymer tapes 310) in improved seal ability.

In several exemplary embodiments, one or more of the operational steps of the method 200 may be omitted. For example, the step 220 may be omitted such that the PTFE cylinder 315 is not compressed. Instead, the PTFE cylinder 315 is dried in the oven at the step 225, sintered at the step 230, and then cut radially at the step 235 without having been compressed in the mold 600.

Figure 7:
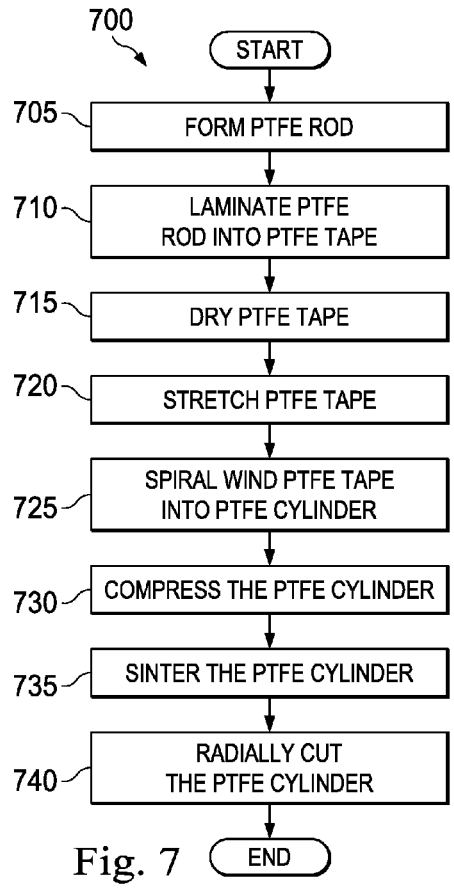
FIG. 7 is a flow chart illustration of another method of manufacturing the gasket of FIG. 1, according to an exemplary embodiment.

FIG. 7 illustrates another method of manufacturing the gasket 100 and is generally referred to by the reference numeral 700. The method 700 includes the steps of forming the PTFE rod at step 705, laminating the PTFE rod into PTFE tape 300 at step 710, drying the PTFE tape 300 at step 715, stretching the PTFE tape 300 at step 720, spiral winding the PTFE tape 300 into the PTFE cylinder 315 at the step 725, compressing the PTFE cylinder 315 at the step 730, sintering the PTFE cylinder 315 at step 735, and radially cutting the PTFE cylinder 315 at step 740.

At the step 705, the PTFE rod is formed. The step 705 is identical or substantially similar to the step 205 and therefore will not be described again here.

At the step 710, the PTFE rod is laminated into the PTFE tape 300. The step 710 is identical or substantially similar to the step 210 and therefore will not be described again here.

At the step 715, the PTFE tape 300 is dried in an oven to remove the lubricant. In an exemplary embodiment, the step 715 includes conventional methods of drying PTFE in an oven.

At the step 720, the PTFE tape 300 is stretched. In an exemplary embodiment, the PTFE tape 300 is stretched using a variety of heated and unheated rolls. In an exemplary embodiment, the step 720 includes conventional methods of stretching the PTFE tape 300 over heated rolls.

At the step 725, the PTFE tape 300 is spirally wound into the PTFE cylinder 315. The step 725 is identical or substantially similar to the step 215 and therefore will not be described again here.

At the step 730, the PTFE cylinder 315 is compressed. The step 730 is identical or substantially similar to the step 220 and therefore will not be described again here.

At the step 735, the PTFE cylinder 315 is sintered. The step 735 is identical or substantially similar to the step 230 and therefore will not be described again here.

At the step 740, the PTFE cylinder 315 is radially cut. The step 740 is identical or substantially similar to the step 235 and therefore will not be described again here.

Using the method 700, a gasket 100 is formed which has an impermeable or nearly impermeable polymer layer that results (due to the one or more polymer tapes 310) in improved sealability.

In several exemplary embodiments, one or more of the operational steps of the method 700 may be omitted. For example, the step 730 may be omitted such that the PTFE cylinder 315 is not compressed. Instead, the PTFE cylinder 315 is sintered at the step 735 and then cut radially at the step 740 without having been compressed in the mold 600. Moreover, the step 720 may be omitted such that the PTFE tape 300 is not stretched.

Using the method 700 involves drying the PTFE tape 300 before spiral winding the PTFE tape 300 into the PTFE cylinder 315, unlike the method 200, which involves spiral winding the PTFE tape 300 into the PTFE cylinder 315 and then drying the PTFE cylinder 315. Additionally, the method 700 may include stretching the PTFE tape 300.

Figure 8:
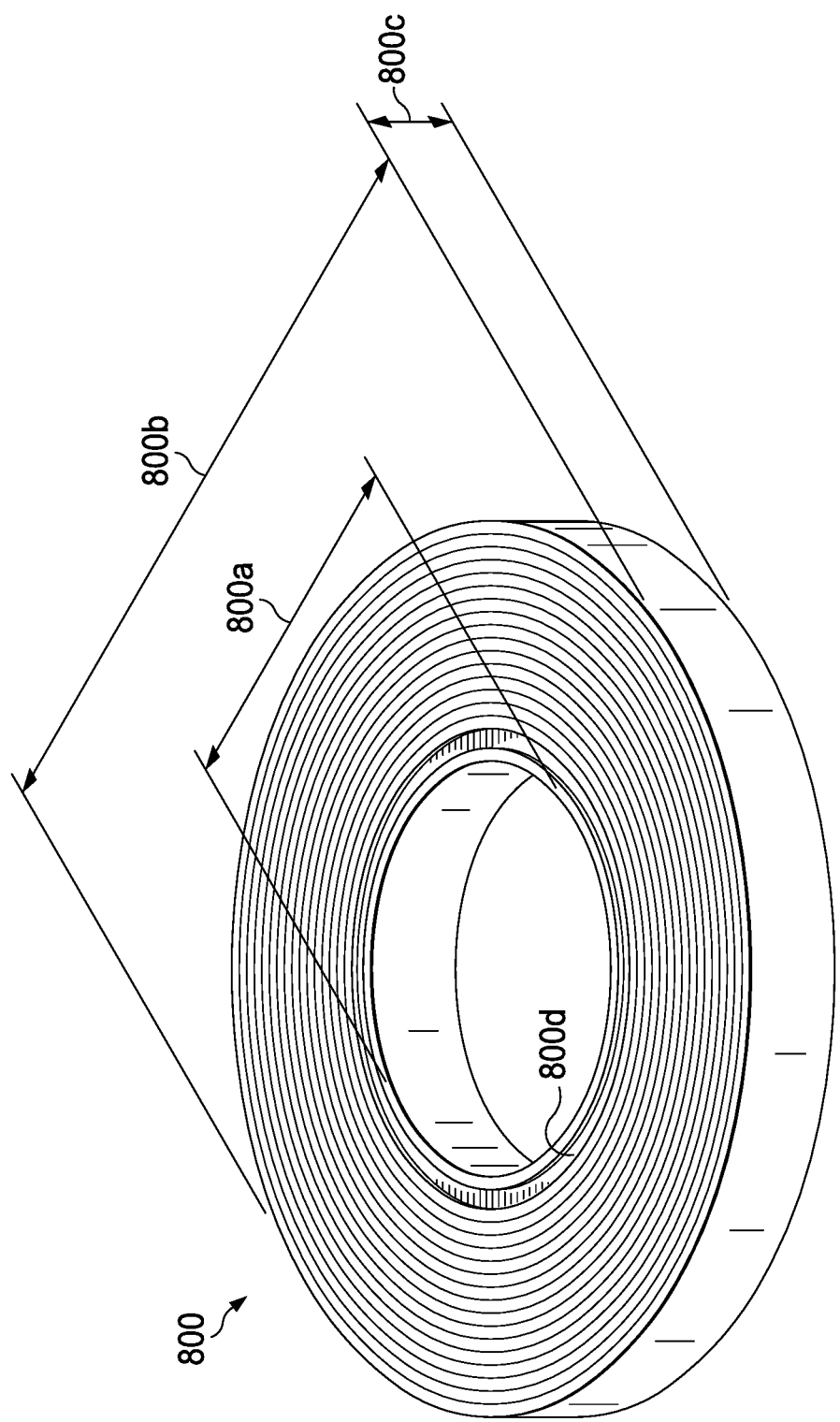
FIG. 8 illustrates a perspective view of another exemplary embodiment of the gasket of FIG. 1, according to an exemplary embodiment.

FIG. 8 illustrates another exemplary embodiment of the gasket 100. FIG. 8 is a perspective view of a spirally-wound, serrated PTFE gasket that is generally referred to by the reference numeral 800. The gasket 800 defines an inner diameter 800a, an outer diameter 800b, and a gasket thickness 800c. In one embodiment, the gasket 800 may also include a serration 800d.

Figure 9:
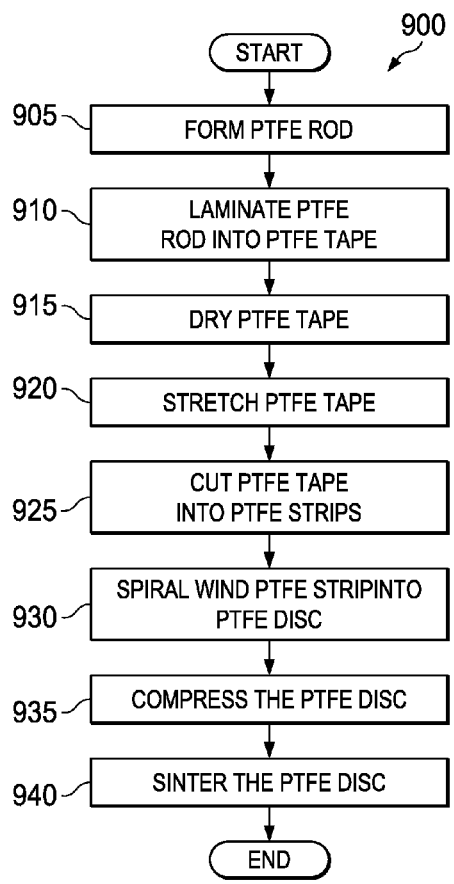
FIG. 9 is a flow chart illustration of a method of manufacturing the gasket of FIG. 8, according to an exemplary embodiment.

As illustrated in FIG. 9, a method of manufacturing the gasket 800 is generally referred to by the reference numeral 900. Referring to FIG. 9, the method 900 includes the steps of forming the PTFE rod at the step 905, laminating the PTFE rod into the PTFE tape 300 at the step 910, drying the PTFE tape 300 at the step 915, stretching the PTFE tape 300 at the step 920, cutting the PTFE tape 300 into PTFE strips at step 925, spiral winding a PTFE strip into a PTFE disc at step 930, compressing the PTFE disc at step 935, and sintering the PTFE disc at step 940.

At the step 905, the PTFE rod is formed. The step 905 is identical or substantially similar to the step 205 and therefore will not be described again here.

At the step 910, the PTFE rod is laminated into the PTFE tape 300. The step 910 is identical or substantially similar to the step 210 and therefore will not be described again here.

At the step 915, the PTFE tape 300 is dried in an oven to remove the lubricant. The step 915 is identical or substantially similar to the step 715 and therefore will not be described again here.

At the step 920, the PTFE tape 300 is stretched. The step 920 is identical or substantially similar to the step 720 and therefore will not be described again here.

At the step 925, the PTFE tape 300 is cut into PTFE strips having a width that coincides with the thickness 800c of the gasket 800.

Figure 11:
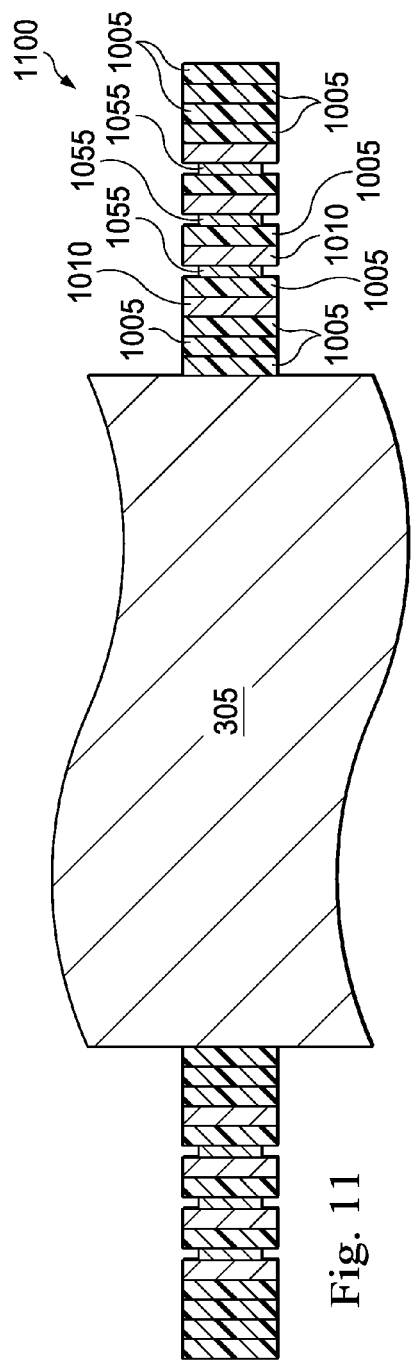
FIG. 11 illustrates a sectional view of the shaft and the disc of FIG. 10a, according to another exemplary embodiment.
Figure 12:
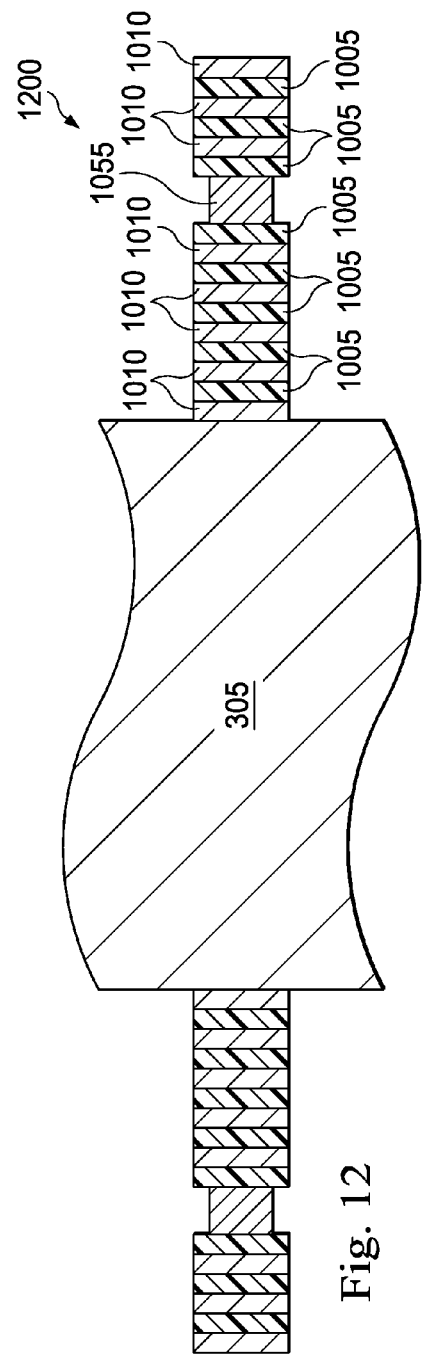
FIG. 12 illustrates a sectional view of the shaft and the disc of FIG. 10a, according to yet another exemplary embodiment.
Figure 15:
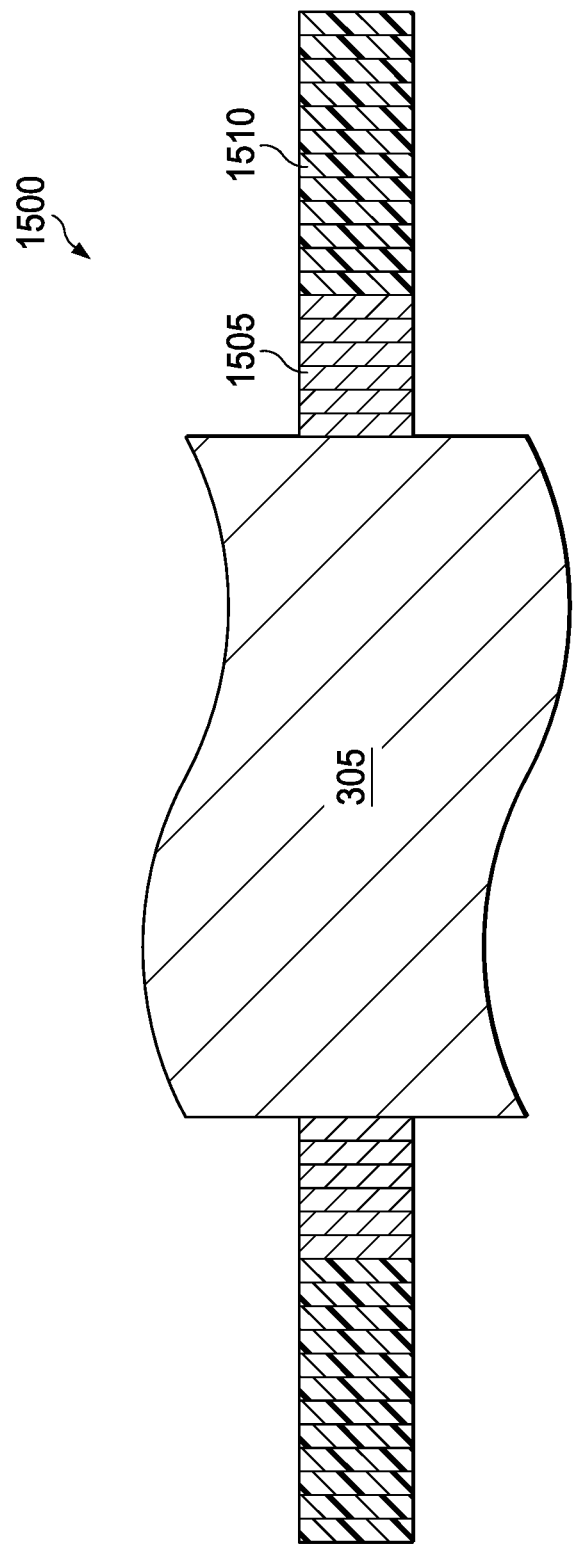
FIG. 15 illustrates a sectional view of the shaft and the disc of FIG. 10a, according to yet another exemplary embodiment.

At the step 930, a PTFE strip is spirally wound around the shaft 305 to form a PTFE disc. The step 930 is similar to the step 215 of the method 200 except that the PTFE strip is wound around the shaft 305 to form the PTFE disc instead of the PTFE tape 300 being wound around the shaft 305 to form the PTFE cylinder 315. FIG. 10a illustrates a cross-sectional view of the shaft 305 and a PTFE disc 1000 that has an inner diameter 1000a that coincides with the inner diameter 800a, an outer diameter 1000b that coincides with the outer diameter 800b, and a thickness 1000c that coincides with the gasket thickness 800c. Referring to FIG. 10a, a PTFE strip is spirally wound around the shaft 305 to form an inner, or first layer 1005. In an exemplary embodiment, the one or more polymer tapes 310 have a width coinciding with the gasket thickness 800c. These one or more polymer tapes 310 having a width equal to the gasket thickness 800c, or one or more polymer strips, may then be spirally wound around the first layer 1005 to form a second layer 1010. Additional PTFE strips and the one or more polymer strips are used to form additional layers 1015, 1020, 1025, 1030, 1035, 1040, 1045, and 1050. The one or more polymer tapes 310, such as a polymer tape composed of dense PTFE, increase the sealability of the gasket 800 by providing a barrier against media leakage. The metallic strip may also be spirally wound around the layer 1050 to form a metallic layer 1055. Either the PTFE strip or the one or more polymer strips may then be wound around the metallic layer to form a layer 1060. Generally, the metallic strip has a width that is less than the width of the PTFE strip and the one or more polymer strips. Thus, when the metallic strip is spirally wound to form the layer 1055, a spacing 1055*a* (shown in FIG. 10*b*) is formed between the layers 1050 and 1060 that are adjacent the metallic layer. The spacing 1055*a* defines the serration 800*d*. The PTFE strip, the one or more polymer strips, and the metallic strip may be wound around the shaft 305 in a variety of patterns to form layers of varying thickness, as shown in the alternate embodiments of the disc 1000 in FIGS. 11 and 12. Regarding the FIGS. 11 and 12, the PTFE strip, the one or more polymer strips, and the metallic strip are wound around the shaft 305 until a disc 1100 and a disc 1200 have an outer diameter that coincides with the outer diameter 800*b*. In some embodiments, the one or more polymer strips may be adhered or otherwise attached to the shaft 305 and wound around the shaft 305. An example of a disc in which the one or more polymer strips are adhered to the shaft 305 is depicted in FIG. 12. Referring to FIG. 12, after the one or more polymer strips are wound around the shaft 305 to form a polymer layer 1005, the PTFE strip is then adhered or otherwise attached to the one or more polymer strips that is wound around the shaft 305 to form a PTFE layer 1010 and so on. In another embodiment, the one or more polymer strips may be omitted. For example and as shown in another exemplary embodiment of the disc 1000 that is represented by the numeral 1300 in FIG. 13, the one or more polymer strips may be omitted from the disc 1300. The metallic strip may be placed near the inner diameter of the disc 1300 to form multiple metallic layers 1305, 1310, 1315, and 1320 spaced between PTFE layers 1325, 1330, 1335, and 1340. In another embodiment of the disc 1000 that is represented by the numeral 1400 in FIG. 14, the metallic strip may form a single metallic layer 1405 that is spaced from the inner diameter of the disc 1400 by a PTFE layer 1410 and spaced from the outer diameter by a PTFE layer 1415. In an exemplary embodiment, the metallic layer 1405 may have a cross-section that is uniform and symmetrical as shown in FIG. 14, or may have a "V" or "W" cross-sectional shape. In some embodiments, the metallic layer may be spot welded to form a base structure that defines the inner diameter 800*a* or the outer diameter 800*b* of the gasket 800. In an exemplary embodiment, the metallic base structure reduces the likelihood of the occurrence of the blow-out phenomenon. In another exemplary embodiment of the disc 1000 that is represented by the numeral 1500 in FIG. 15, the metallic strip may be omitted from the disc 1500. Thus, the disc 1500 includes a polymer layer 1505 and a PTFE layer 1510. Each of the discs 1000, 1100, 1200, 1300, 1400, and 1500 has an inner diameter that coincides with the inner diameter 800*a*, has an outer diameter that coincides with the outer diameter 800*b*, and a thicknesses that coincides with the thickness 800*c*.

Figure 16:
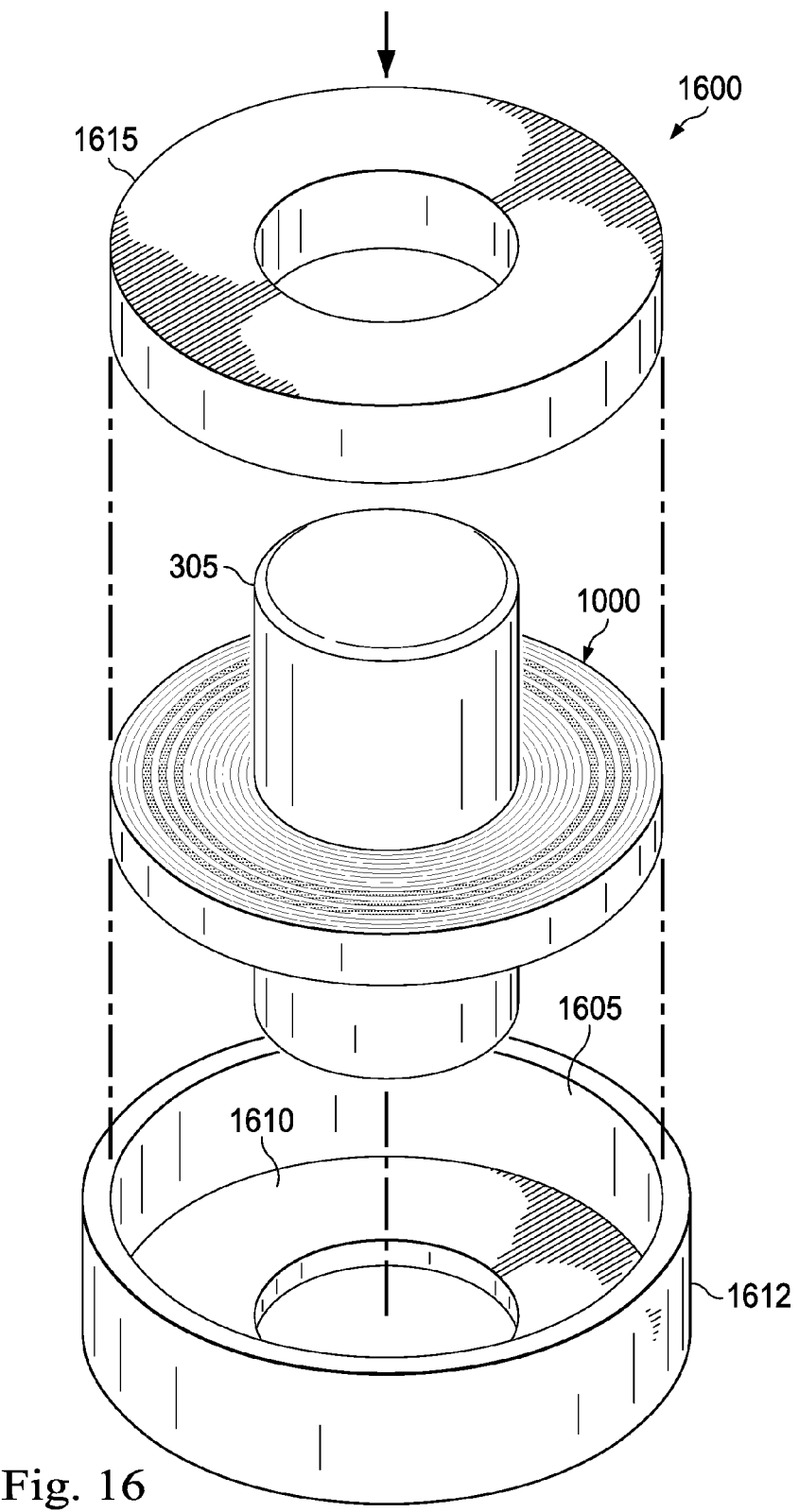
FIG. 16 is an exploded view of a mold, the shaft, and the disc of FIG. 10a, according to an exemplary embodiment.

At the step 935, the PTFE disc 1000 is compressed in a mold 1600 that is illustrated in FIG. 16. Referring to FIG. 16, and in one embodiment, the PTFE disc 1000 and the shaft 305 may be placed in a cavity 1605 formed by a lower plate 1610 and an outer ring 1612 of the mold 1600. The composite PTFE disc 1000 may then be compressed by an upper portion 1615 of the mold 1600. In an exemplary embodiment, the mold 1600 compresses the composite PTFE disc 1000 at a pressure from 1 MPa to 70 MPa. In one or more embodiments, the mold 1600 may include the shaft 305. The shaft 305 may prevent the radial expansion of the disc 1000 in the inward direction (reduction of the inner diameter 1000*a*) during compression between the upper portion 1615 and the lower plate 1610 and the radial contraction of the disc 1000 during cooling. Generally, the upper portion 1615 and the lower plate 1610 compress the disc 1000 in an axial direction while the shaft 305 and the outer ring 1612 define the inner diameter 1000*a* and the outer diameter 1000*b*. In an exemplary embodiment, the mold 1600 is a demountable mold, which may ensure the regularity of an outer surface of the PTFE disc 1000 during cooling of the PTFE disc 1000. The mold 1600 may be composed of any material that has sufficient mechanical strength and temperature resistance and that does not contaminate the disc 1000 with dust and oxidation products. Examples of mold materials are stainless steels and nonferrous alloys. In one embodiment and in place of the mold 1600, the disc 1000 may be sintered or compressed between two metallic plates. During the step 935, the mold 1600 provides a contact pressure from 1 to 70 MPa to the disc 1000. In one exemplary embodiment, the mold 1600 provides a contact pressure from 3 to 10 MPa.

At the step 940, the PTFE disc 1000 is sintered to form the gasket 800. The PTFE disc 1000 may be sintered while engaged with the shaft 305 and while compressed in the mold 1600. The shaft 305 may prevent the radial expansion of the disc 1000 in the inward direction (reduction of the inner diameter 1000*a*) during sintering and the radial contraction of the disc 1000 during cooling. In an exemplary embodiment, the PTFE disc 1000 is heated to a temperature of from 320° C. to 390° C. In another exemplary embodiment, the PTFE disc 1000 is heated to a temperature of from 350° C. to 380° C. for a time period of from 10 minutes to 16 hours, or from 30 minutes to 4 hours.

In several exemplary embodiments, one or more of the operational steps may be omitted. For example, step 935 may be omitted such that the disc 1000 is not compressed in the mold 1600. Instead, the disc 1000 may be sintered at the step 940 without having been compressed. Moreover, the step 920 may be omitted such that the PTFE tape 300 is not stretched. In an exemplary embodiment and when the step 920 is omitted, the method 900 may include sintering the PTFE tape 300 after the step 915 and before the step 925.

In several exemplary embodiments, stretching the PTFE tape 300 in step 720 and/or step 920 results in expanded PTFE tape 300. In an exemplary embodiment, the PTFE tape 300 is a monoaxially expanded laminated PTFE tape, a biaxially expanded laminated PTFE tape, or a multiaxially expanded laminated PTFE tape.

Using the method 900, a gasket 800 is formed which has an impermeable or nearly impermeable polymer layer that results (due to the one or more polymer strips) in improved sealability. In an exemplary embodiment, the gasket 800 having one or more metallic layers to form a serration 800*d* reduces the likelihood of the occurrence of the blow-out phenomenon.

Using the methods 200, 700, and/or 900, waste generated during the manufacturing process is reduced. Conventional gasket manufacturing techniques in which circular gaskets are cut from rectangular or square PTFE sheets may result in 40% to 60% of PTFE sheet waste. Considering that PTFE does not degrade with time, even when exposed to sunlight and other environmental effects, the reduction of PTFE sheet waste in the manufacturing process is desirable. Here, using the methods 200, 700, and/or 900, the gaskets 100 and 800 are manufactured without generating PTFE sheet waste. Generally, the methods 200, 700, and/or 900 result in cost savings compared to conventional manufacturing methods of PTFE gaskets.

Additionally, using the methods 200, 700, and/or 900, the outer diameter 100*b* of the gasket 100 and the outer diameter 800*b* of the gasket 800 are not limited by the size of a PTFE sheet. While conventional gaskets may be spliced together to form a large-sized gasket, the gaskets 100 and/or 800 are splice-free. Generally, splices are detrimental to gasket performance because the areas of the gasket that contain the splice are weak, which can cause leaks or blowouts. Here, the methods 200, 700, and/or 900 result in splice-free large gaskets.

During the methods 200, 700, and/or 900, a layer may be composed of one tape or of multiple tapes. That is, one PTFE tape may form a layer, or two consecutive PTFE tapes may form a layer. Similarly, a layer may be composed of one strip or of multiple strips. During the methods 200, 700, and/or 900, the one or more polymer tapes 310 may include two polymer materials "stacked" along the longitudinal axis of the PTFE cylinder 315 or the disc 1000 or wound consecutively after one another to result in two polymer materials being spaced radially along the PTFE cylinder 315 or the disc 1000. In one embodiment, and during the methods 200, 700, and/or 900, at least one of the tapes or strips is wound around the shaft multiple times so that the tape or strip is wrapped around itself before another tape or strip is wound around the shaft. In one or more exemplary embodiments, at least one of the tapes or strips has a length that is greater than the circumference of the gasket 100 or 800. However, in another exemplary embodiment, the tapes or strips that are wound around the shaft do not wrap around themselves. That is, the tape or strip is only wound around the shaft once before another tape or strip is added.

In several experimental exemplary embodiments, experimental sealability analyses were conducted on a conventional PTFE gasket and a First Experimental Embodiment of the gasket 100. The conventional PTFE gasket was filled with hollow glass micro-spheres and was obtained from the cutting of a PTFE sheet produced by the HS-10 method. The First Experimental Embodiment of the gasket 100 included one polymer layer formed from laminated PTFE strip (i.e., the one or more polymer tapes 310 that form the one polymer layer is a laminated PTFE strip that is dense or has low porosity). Tests were performed at room temperature on a DN3 Class 150 flat face Fiberglass reinforced plastic (FRP) flange using nitrogen as a test fluid at a fluid pressure of 30 psi. For this example, a gasket seating stress of 500 psi (3.45 MPa) was applied to both the conventional PTFE gasket and the First Experimental Embodiment of the gasket 100.

Figure 17:
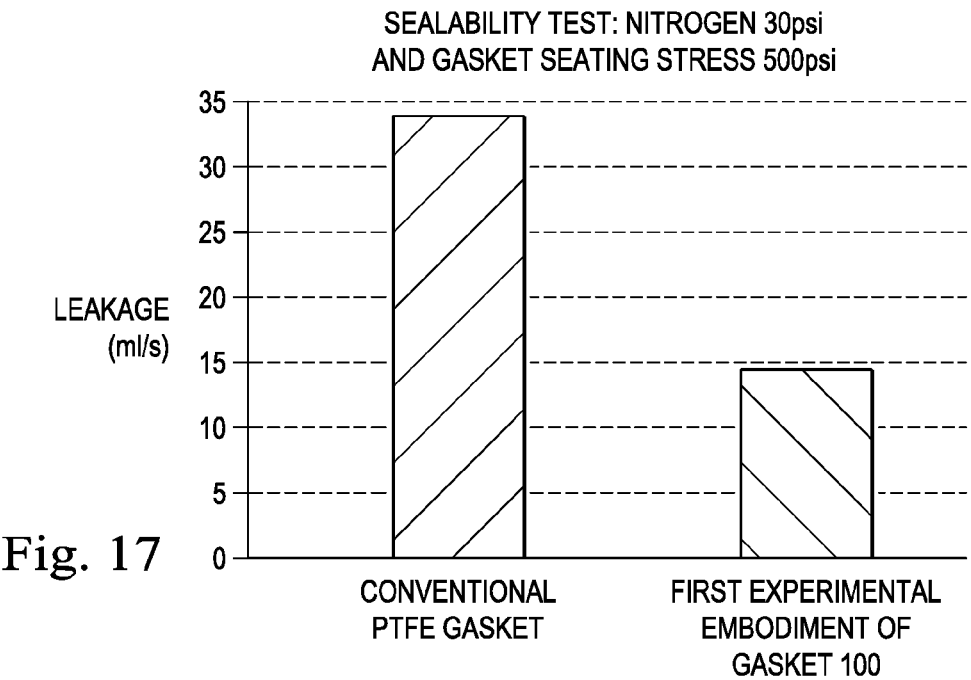
FIG. 17 is a chart depicting sealability test results of a First Experimental Embodiment of the gasket of FIG. 1 and a conventional PTFE gasket.

FIG. 17 is a chart depicting the sealability test results of the First Experimental Embodiment of the gasket 100 and the conventional PTFE gasket. As shown in FIG. 17, the leakage for the conventional PTFE gasket is 33.33 ml/s while the leakage for the First Experimental Embodiment of the gasket 100 is 14.28 ml/s. Therefore, the First Experimental Embodiment of the gasket 100 has improved sealability compared to the conventional PTFE gasket produced by the HS-10 conventional method.

Figure 18:
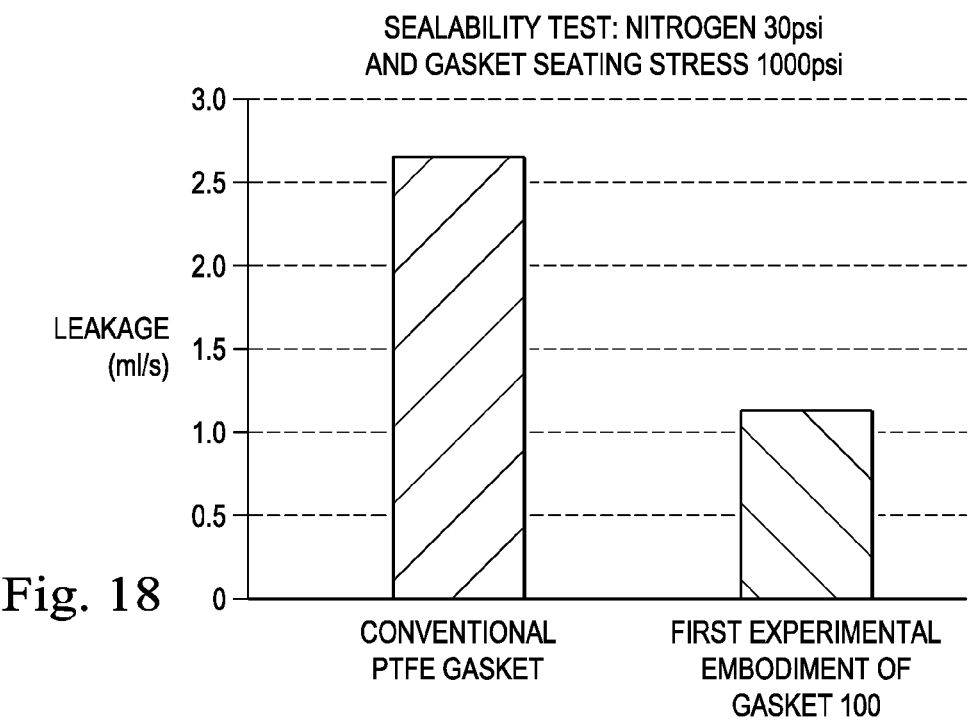
FIG. 18 is another chart depicting sealability test results of the First Experimental Embodiment of the gasket of FIG. 1 and a conventional PTFE gasket.

FIG. 18 is a chart depicting additional sealability test results of the First Experimental Embodiment of the gasket 100 and the conventional PTFE gasket. The test conditions were identical to the test conditions associated with FIG. 17 except that the gasket seating stress was 1000 psi (6.89 MPa) instead of 500 psi (3.45 MPa). As shown in FIG. 18, the leakage for the conventional PTFE gasket is 2.60 ml/s while the leakage for the First Experimental Embodiment of the gasket 100 is 1.10 ml/s. Therefore, the First Experimental Embodiment of the gasket 100 has improved sealability compared to the conventional PTFE gasket produced by the HS-10 conventional method.

The improved sealability of First Experimental Embodiment of the gasket 100 was an unexpected result. Not only do the methods 200, 700, and 900 result in cost savings compared to conventional manufacturing methods of PTFE gaskets, the gaskets 100 and 800 that are produced using the methods 200, 700, and 900 have improved sealability compared to conventional gaskets.

Figure 19:
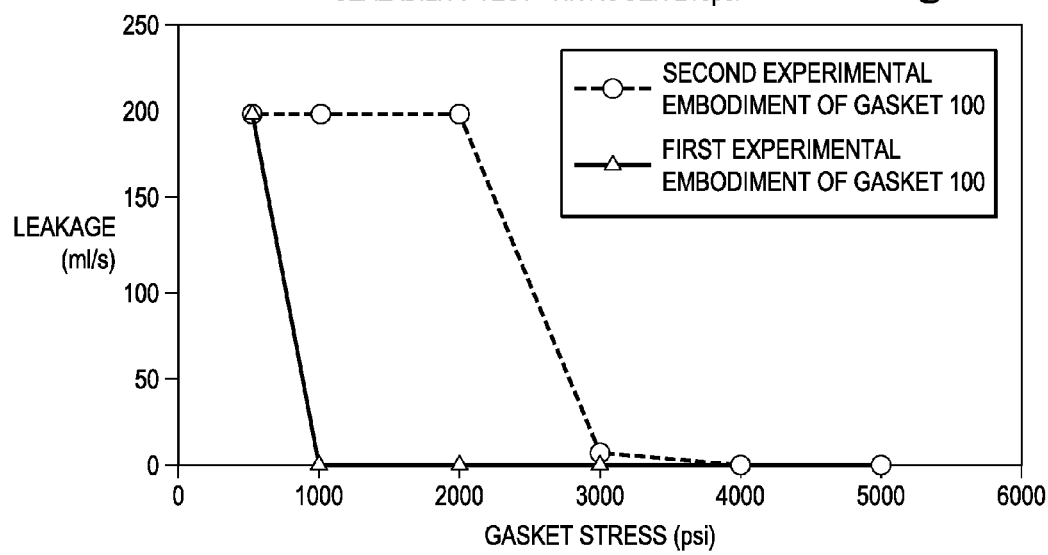
FIG. 19 is a chart depicting sealability test results of the First Experimental Embodiment of the gasket of FIG. 1 and a Second Experimental Embodiment of the gasket of FIG. 1.

In several experimental exemplary embodiments, experimental sealability analyses were conducted on the First Experimental Embodiment of the gasket 100 and a Second Experimental Embodiment of the gasket 100 that is a uniform gasket (does not contain any polymer layers). Tests were performed at room temperature on a DN3 Class 150 raised face SA 105 forged flange using nitrogen as a test fluid at a fluid pressure of 218 psi. For this example, a groove of 0.5 mm deep was machined in one sealing surface of the flange to simulate a possible flaw on the flange. Seating gasket stresses of 500, 1000, 2000, 3000, 4000 and 5000 psi were applied to both the First Experimental Embodiment and the Second Experimental Embodiment. FIG. 19 is a chart depicting the sealability test results of the First Experimental Embodiment and the Second Experimental Embodiment. As shown in FIG. 19, the leakage for the Second Experimental Embodiment is 200 ml/s for the seating gasket stresses of 500, 1000, and 2000 psi and nearly zero for the remaining seating gasket stresses. Also, the leakage for the First Experimental Embodiment is 200 ml/s for the seating gasket stresses of 500 psi and nearly zero for the remaining gasket seating stresses. Therefore, the First Experimental Embodiment has improved sealability compared to the Second Experimental Embodiment since the First Experimental Embodiment reached very low leakage rates at 1000 psi of gasket seating stress while the Second Experimental Embodiment reached the same values with a gasket seating stress of 3000 psi.

Figure 20:
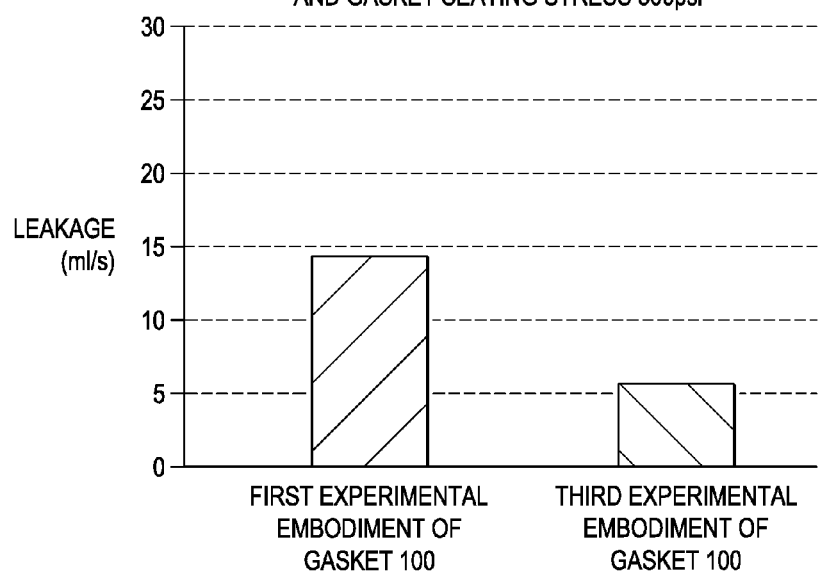
FIG. 20 is a chart depicting sealability test results of the First Experimental Embodiment of the gasket of FIG. 1 and a Third Experimental Embodiment of the gasket of FIG. 1.
Figure 21:
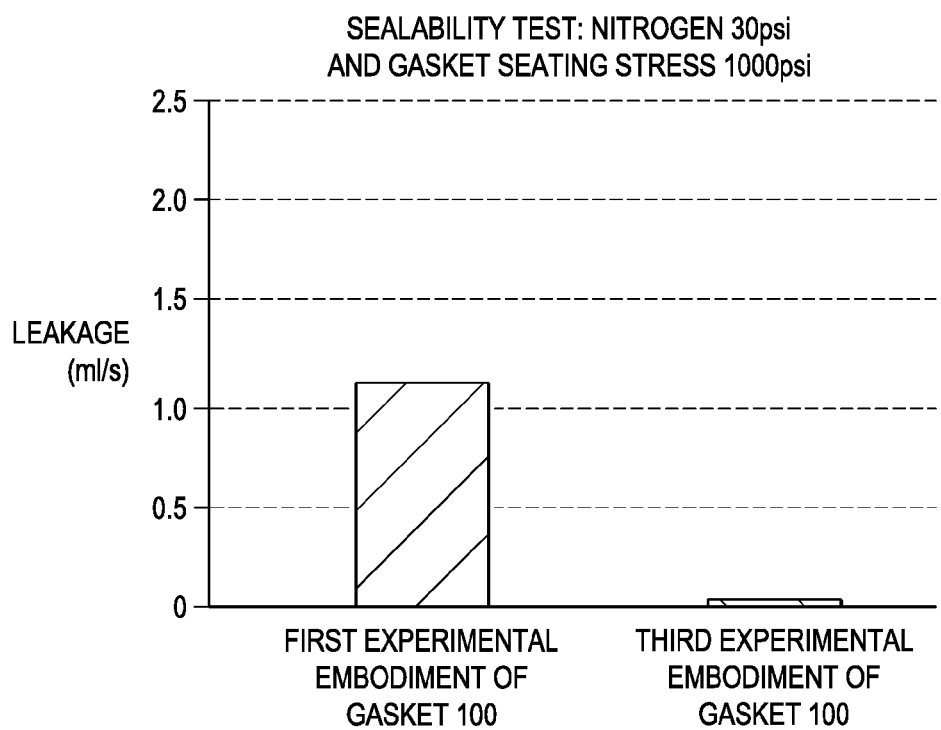
FIG. 21 is another chart depicting sealability test results of a First Experimental Embodiment of the gasket of FIG. 1 and the Third Experimental Embodiment of the gasket of FIG. 1.

In several experimental exemplary embodiments, experimental sealability analyses were conducted on the First Experimental Embodiment of the gasket 100 and a Third Experimental Embodiment of the gasket 100 that includes two polymer layers formed from laminated PTFE strip (i.e., the one or more polymer tapes 310 that form the two polymer layers is a laminated PTFE strip that is dense or has low porosity). Tests were performed at room temperature on a DN3 Class 150 flat face FRP flange using nitrogen as a test fluid at a fluid pressure of 30 psi. A gasket seating stress of 500 psi (3.45 MPa) was applied to both the First and Third Experimental Embodiments. FIG. 20 is a chart depicting the sealability test results of the First Experimental Embodiment and the Third Experimental Embodiment. As shown in FIG. 20, the leakage for the First Experimental Embodiment is 14.28 ml/s while the leakage for the Third Experimental Embodiment is 5.71 ml/s. Therefore, the Third Experimental Embodiment has improved sealability (i.e., reduction of leakage by 60%) compared to the First Experimental Embodiment. FIG. 21 is a chart depicting additional sealability test results of the First and Third Experimental Embodiments. The test conditions were identical to the test conditions associated with FIG. 20 except that the gasket seating stress was 1000 psi (6.89 MPa) instead of 500 psi (3.45 MPa). As shown in FIG. 21, the leakage for the First Experimental Embodiment is 1.10 ml/s while the leakage for the Third Experimental Embodiment is 0.0022 ml/s. Therefore, the Third Experimental Embodiment has improved sealability (i.e., reduction of leakage by 99.8%) compared to the First Experimental Embodiment.

The addition of a second polymer layer resulted in the reduction of leakage by 60% when tested under a gasket seating stress of 500 psi and the reduction of leakage by 99.8% when tested under a gasket seating stress of 1000 psi, which is an unexpected result.

Figure 22:
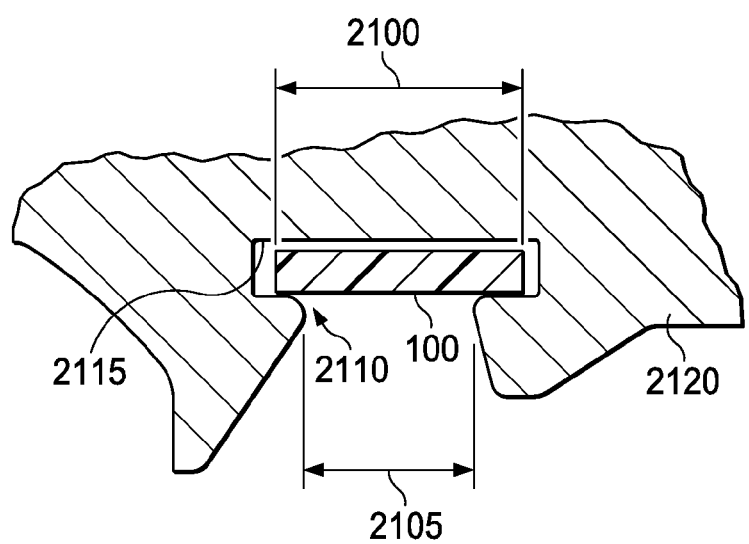
FIG. 22 illustrates a partial sectional view of the gasket of FIG. 1 seated in a groove formed within a manway cover, according to an exemplary embodiment.

ASTM F36-15: Standard Test Method for Compressibility and Recovery of Gasket Materials specifies testing methods for compression and recovery of gasket materials. Procedure M of Test Method F36 relates to the testing of Fluorocarbon polymer (sheet, form-in-place gaskets) gasket material. A conventional PTFE gasket and a Fourth Experimental Embodiment of the gasket 100 that included the expanded PTFE tape 300 were field tested in a 6-Bolt AAR-1 Railroad Car Tank Manway Cover with compressed air at 50 psi. The leakage of the Fourth Experimental Embodiment was 0.003 mg/s·m. and the leakage of the conventional PTFE gasket was 0.016 mg/s·m. Thus, the Fourth Experimental Embodiment has improved sealability (i.e., reduction of leakage by 81.25%) compared to a conventional PTFE gasket. Additionally, compressibility tests of the Fourth Experimental Embodiment, in accordance with ASTM F36 Procedure M, resulted in compressibility between about 10% and about 70%, preferably between about 20% and about 50%. Standard PTFE gasket material generally has compressibility up to about 12%, but normally below about 10%. Thus, the Fourth Experimental Embodiment has increased or improved compressibility compared to a conventional PTFE gasket. Due to the increased compressibility of the Fourth Experimental Embodiment, installation of the Fourth Experimental Embodiment is often easier than installation of a conventional PTFE gasket, which has lower compressibility. For example, the Fourth Experimental Embodiment is easier to seat in a flange sealing surface that has surface irregularities, thus assuring a better seal. Additionally, when the Fourth Experimental Embodiment must be deformed before being seated in a final sealing position, the flexibility of the Fourth Experimental Embodiment (due to increased compressibility) is greater than with a conventional PTFE gasket. For example and as shown in FIG. 22, when the Fourth Experimental Embodiment of the gasket 100 has a first dimension 2100 that is equal to or greater than a dimension 2105 associated with an opening 2110 to a gasket seat 2115, that is formed within a manway cover 2120, the Fourth Experimental Embodiment must deform to pass through the opening 2110 and be seated in the gasket seat 2115. Due to the increased flexibility of the Fourth Experimental Embodiment, installing the Fourth Experimental Embodiment is quicker than installing a conventional PTFE gasket since the Fourth Experimental Embodiment can easily slide through the opening 2110 and into the gasket seat 2115. Consequently, the time required to install the Fourth Experimental Embodiment onto the gasket seat 2115 may be approximately 30 seconds, while the time required to install a conventional PTFE gasket may be up to 5 minutes. Thus, the time required to install the Fourth Experimental Embodiment on the gasket seat 2115 is less than the time required to install a conventional PTFE gasket.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

It is understood that variations may be made in the foregoing without departing from the scope of the disclosure.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those of ordinary skill in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method of manufacturing a gasket having a gasket thickness, a gasket inner diameter, and a gasket outer diameter, the method comprising:
    winding a PTFE laminate tape around a shaft that has an outer diameter that coincides with the gasket inner diameter to create a PTFE cylinder having an outer diameter that coincides with the gasket outer diameter, wherein the PTFE laminate tape includes a filler;
    winding a polymer tape around the shaft, the polymer tape being less porous than the PTFE laminate tape;
    sintering the PTFE cylinder; and
    removing a radial segment of the PTFE cylinder to form the gasket, the radial segment having a thickness that coincides with the gasket thickness.

2. The method of claim 1, further comprising drying the PTFE cylinder.

3. The method of claim 1, further comprising drying the PTFE laminate tape.

4. The method of claim 1, further comprising compressing the PTFE cylinder in a mold.

5. The method of claim 1, further comprising stretching the PTFE laminate tape.

6. The method of claim 1, further comprising extruding a PTFE billet to form the PTFE laminate tape.

7. The method of claim 1, wherein the PTFE laminate tape is a monoaxially expanded PTFE laminate tape, a biaxially expanded PTFE laminate tape, or a multiaxially expanded PTFE laminate tape.

8. The method of claim 1, wherein the filler is a mineral filler.

9. The method of claim 1, wherein the polymer tape is an impermeable polymer tape.

10. The method of claim 1, wherein the polymer tape comprises at least one of low porosity polytetrafluoroethylene; ethylene tetrafluoroethylene; perfluoroalkoxy; tetrafluoroethylene-perfluoro copolymer; and fluoroethylene propylene.

11. The gasket produced by the method of claim 1.

12. A method of manufacturing a gasket having a gasket thickness, a gasket inner diameter, and a gasket outer diameter, the method comprising:
   winding a PTFE laminate strip around a shaft that has an outer diameter that coincides with the gasket inner diameter to create a PTFE disc having an outer diameter that coincides with the gasket outer diameter, wherein the PTFE laminate strip includes a filler;
   winding a polymer strip around the shaft, the polymer strip being less porous than the PTFE laminate strip;
   winding a metallic strip around the shaft, wherein the metallic strip has a width that is less than a width of the PTFE laminate strip; and
   sintering the PTFE disc.

13. The method of claim 12, further comprising compressing the PTFE disc.

14. The method of claim 12, further comprising extruding a PTFE billet to form a PTFE laminate tape.

15. The method of claim 14, further comprising drying the PTFE laminate tape.

16. The method of claim 14, further comprising cutting the PTFE laminate tape to form the PTFE laminate strip.

17. The method of claim 15, further comprising sintering the PTFE laminate tape.

18. The method of claim 15, further comprising stretching the PTFE laminate tape.

19. The method of claim 12, wherein the PTFE laminate strip has a width that coincides with the gasket thickness.

20. The method of claim 12, wherein the polymer strip has a width that coincides with the gasket thickness.

21. The gasket produced by the method of claim 12.

22. The method of claim 12, wherein the PTFE laminate strip is a monoaxially expanded PTFE laminate strip, a biaxially expanded PTFE laminate strip, or a multiaxially expanded PTFE laminate strip.

23. The method of claim 12, wherein the filler is a mineral filler.

24. The method of claim 12, wherein the polymer strip is an impermeable polymer strip.

\* \* \* \* \*